United States Patent
Narioka

Patent Number: 6,081,609
Date of Patent: Jun. 27, 2000

[54] APPARATUS, METHOD AND MEDIUM FOR PROVIDING MAP IMAGE INFORMATION ALONG WITH SELF-REPRODUCTION CONTROL INFORMATION

[75] Inventor: Hiroto Narioka, Kanagawa, Japan

[73] Assignee: Sony Corporation, Tokyo, Japan

[21] Appl. No.: 08/963,697

[22] Filed: Nov. 4, 1997

[30] Foreign Application Priority Data

Nov. 18, 1996 [JP] Japan .................................. 8-306787

[51] Int. Cl.$^7$ .............................. G06K 9/00; G08G 1/123
[52] U.S. Cl. ............................ 382/113; 382/305; 701/202
[58] Field of Search .................................. 382/113, 284, 382/305, 306; 701/24, 25, 28, 201, 202, 208, 209, 211, 212; 340/995

[56] References Cited

U.S. PATENT DOCUMENTS

| | | | |
|---|---|---|---|
| 5,471,205 | 11/1995 | Izawa ....................................... | 340/995 |
| 5,559,707 | 9/1996 | DeLorme et al. ....................... | 364/443 |
| 5,802,492 | 9/1998 | DeLorme et al. ....................... | 701/200 |
| 5,832,406 | 11/1998 | Iwami et al. ............................ | 701/202 |
| 5,874,905 | 2/1999 | Nanba et al. ........................... | 430/995 |

OTHER PUBLICATIONS

O'Leary, "MapQuest and Maps On Us: Top Web map services," *Online*, vol. 21, No. 5, Sep./Oct. 1997, pp. 56–58.

"GeoSystems' MapQuest Unveils the Most Customizable Driving Directions Available on the Web," GeoSystems Global Corporation press release, May 27, 1997, located at URL: http://www.geosys.com/cgi–bin/genobject/pr_MQ-custdirections/tig75b5.

U.S. Patent Application 08/966,944, filed Nov. 10, 1997, Norika.

*Primary Examiner*—Andrew W. Johns
*Attorney, Agent, or Firm*—Limbach & Limbach LLP

[57] ABSTRACT

The present invention enables to provide a route information obtained by a search, even in a personal computer not provided with the same application software.

The present invention includes: a route calculation module for creating a predetermined sequence of image information representing a route connecting at least two points of a starting point and a destination; a navigation guidance creation module; and a self-reproduction file creation module for creating a reproduction control data for reproducing the predetermined sequence of image information and filing the image information and the reproduction control data.

15 Claims, 11 Drawing Sheets

| FUNCTION | ORIGINAL PC | SELF-REPRODUCTION PC |
|---|---|---|
| MAP DISPLAY FUNCTION | ○ | × |
| ROUTE CALCULATION (SEARCH) FUNCTION | ○ | × |
| NAVIGATION GUIDANCE CREATION FUNCTION | ○ | × |
| MAP PRINTING FUNCTION | ○ | × |
| SELF-REPRODUCTION FILE CREATION FUNCTION | ○ | × |
| ENLARGED INTERSECTION IMAGE AND MAP DISPLAY FUNCTION (AREA LIMIT [Qm x Pm] IN SELF-REPRODUCTION) | ○ | ○ |
| CAR NAVIGATION FUNCTION (FUNCTION TO DISPLAY ENLARGED INTERSECTION IMAGE USING THE CURRENT POSITION DATA OF GPS) | ○ | × |
| ENLARGED INTERSECTION IMAGE SLIDE SHOW FUNCTION | ○ | ○ |
| MAP SLIDE SHOW (AREA LIMIT [Qm x Pm] IN SELF-REPRODUCTION) | ○ | ○ |
| VOICED GUIDANCE FUNCTION (INFORMATION PROVIDED IN VOICE TO USER) | ○ | × |

APPARATUS, METHOD AND MEDIUM FOR PROVIDING MAP IMAGE INFORMATION ALONG WITH SELF-REPRODUCTION CONTROL INFORMATION

BACKGROUND OF THE INVENTION

1. Field of the Invention

The present invention relates to an apparatus for providing map information and a recording medium.

2. Description of the Related Art

Conventionally, in a personal computer provided with map display and route searching application software, for example, in the case of searching for a route and providing the searched route to others, the route data obtained by the above mentioned search can be supplied, for example, via a medium such as a memory card and a floppy disk, or via communication, to a personal computer having the same application software However, the route data obtained by the above mentioned search can be exchanged only between personal computers having the same application software. Therefore, in personal computers not having the same application software, it is impossible to utilize the searched route data.

SUMMARY OF THE INVENTION

It is therefore an object of the present invention to provide a map information providing apparatus, a map information providing method, and a recording medium which enable the provision of route information obtained by a search even in a personal computer not provided with the same application software.

The map information providing apparatus, the map information providing method, and the recording medium according to the present invention achieve the aforementioned object by fetching, from map information, image information of passing points on a route connecting at least two points; creating reproduction image information along the route from the image information of said passing points; and filing said reproduction image information and reproduction control data for reproducing said reproduction image information.

Moreover, a recording medium according to another embodiment of the present invention achieves the aforementioned object by recording reproduction image information of passing points along a route connecting at least two points and reproduction control data for reproducing said reproduction image information.

That is, according to the present invention, a predetermined sequence of image information representing a route connecting two points is filed with the addition of reproduction control data for reproducing this predetermined sequence of image information, so that a route between two points can be displayed even on a personal computer not provided with application software for a route search between two points.

DESCRIPTION OF THE PREFERRED EMBODIMENTS

Description will now be directed to a preferred embodiment of the present invention with reference to the attached drawings.

Figure 1:
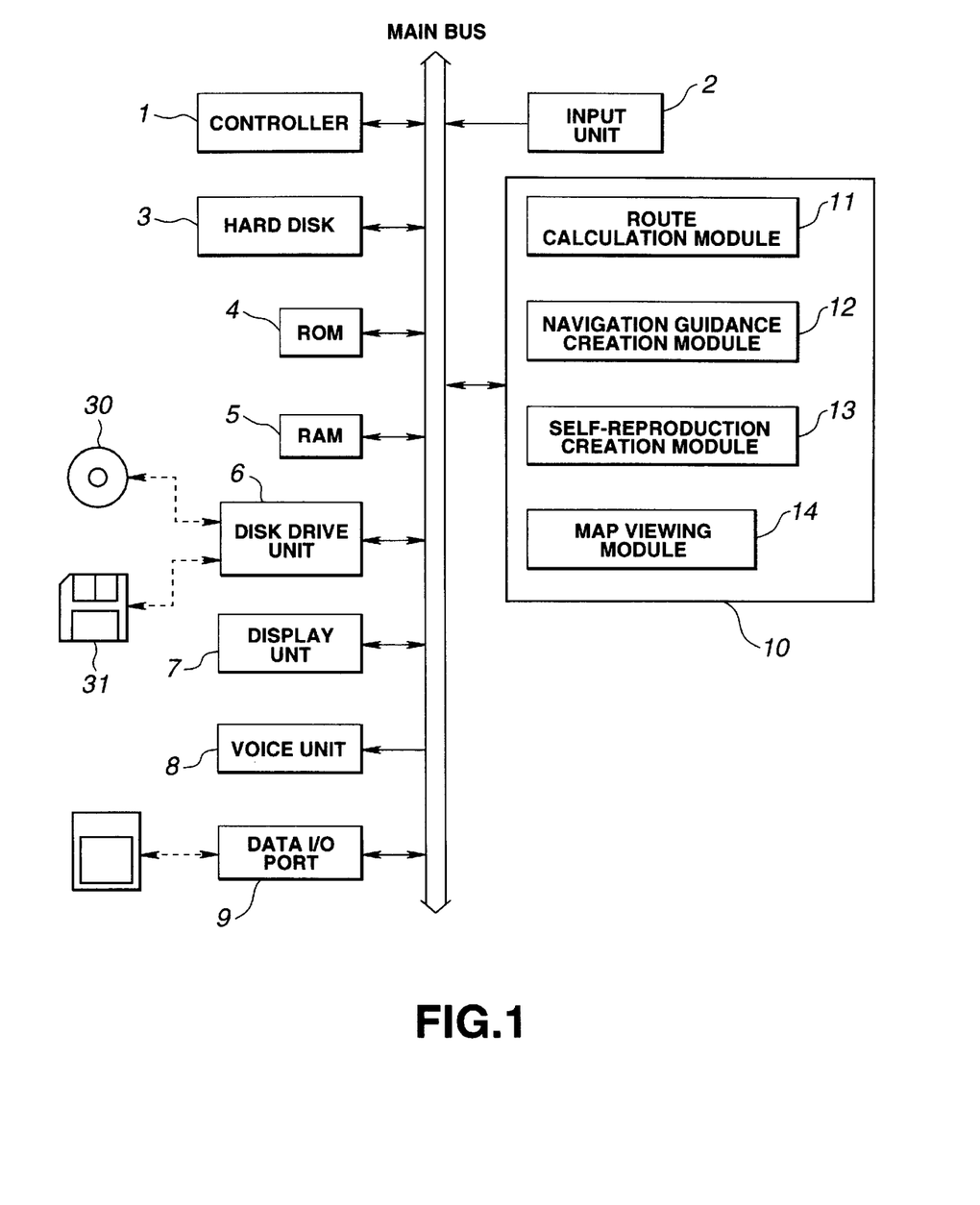
FIG. 1 is a block diagram showing a configuration of a map information providing apparatus according to the present invention.

FIG. 1 shows the configuration of an apparatus and a method for providing map information according to an embodiment of the present invention.

In FIG. 1, each of the components is connected with a controller 1 including, for example, the CPU (a Central Processing Unit) through a main bus. The controller 1 and a respective components will be detailed below.

The controller 1 operates corresponding to, for example, an OS (the Operating System) and application software stored in a hard disk 3 and various programs stored in the ROM 4, and controls operation of the respective components connected through the main bus.

The hard disc 3 is provided for storing the OS and the application software and for recording/reproducing text data, image data, voice data and other file data. The map information providing apparatus according to the present embodiment is also used for recording and reproducing image data consisting of a large amount of data such as a map.

The RAM 5 is a work memory for temporarily storing data during data processing mainly in the controller 1, as well as for temporarily storing data which is used in a route calculation module and other modules.

An input unit 2 includes a mouse, a keyboard, a touch switch and a pen input unit and coverts user input data to data usable inside the apparatus. In the map information providing apparatus according to the present embodiment, various setting data are entered from the input unit 2: such as a starting point and a destination point, i.e., an end point required for automatic route searching, as well as calculation conditions of priority of distance or time. The priority of distance is to search, for example, the shortest route in automatically searching the route, whereas the priority of time is to search the fastest route, for example, a route which is estimated to be the fastest based on a legal speed limit in automatically searching the route.

A disc drive apparatus 6 not only drives a disk type recording medium such as a CD-ROM disk and a floppy disc but also reads data from these recording media as well as writes data when the recording medium is recordable. In the present embodiment, the CD-ROM disk (hereinafter referred to as a map disc 30) containing the digital map data is loaded in the disk drive unit 6 as the disc type recording medium, so as to read the digital map data recorded on the map disk 30. It should be noted that the map disk 30 contains not only the image data of the map but also information such as a distance on the map, legal speed limit, the number of traffic signals, the number of lanes on the street and list of intersections, information for sightseeing and shopping, voice information for route guidance, other sound information, and text information including characters. Further, the disk type recording medium includes not only the CD-ROM as mentioned above but also an optical disc such as DVD (digital video disk) which has been recently implemented in practice.

A data I/O port 9 includes not only, for example, a terminal for inputting/outputting digital data, but also an insert part into which a semiconductor memory element such as a memory card is inserted. In the present embodiment, the data is inputted/outputted through, for example, the terminal for inputting/outputting the data and the memory card to a portable electronic data terminal with a display through the data I/O port 9. The digital map data is supplied through not only the map disk 30 but also the data input/output port 9, for example, via correspondence.

Here, the floppy disk 31 which is inserted into the disk drive unit 6 and memory card 32 which is inserted into the data I/O port 9 contain at least map image data of a predetermined sequence and self-reproduction drive software which will be described later as a recording medium, on which a self-reproduced file is recorded. The self-reproduced file recorded on the recording media according to the present invention will be detailed later.

A display apparatus 7 may be, for example, a CRT (Cathode Ray Tube), a liquid crystal display or a plasma display. which generates an image signal according to image data and text data, and displays an image and characters corresponding to the image signal. Map images and characters are mainly displayed on the display screen of the display apparatus 7 of map information providing apparatus according to the present embodiment.

A map viewing module 14 displays a wide area map on the display screen of the display apparatus 7 as the fundamental screen of the map display software used for the present embodiment. That is, wide area map data is read from the map disk 30 and displayed on display apparatus 7. The screen, on showing a wide area map, will be referred to as a guidance window. On the guidance window, it is possible to set, scroll and zoom (enlarge/contract) the information, such as a starting place, a destination and so on by, for example, employing a mouse of the input unit 2.

A voice unit 8 generates an analog sound signal, from sound data, for example, generated in the controller 1, and outputs sound from a loud-speaker. In the map information providing apparatus according to the present embodiment, a voice for route guidance is mainly generated.

A route calculating module 11 references various parameters concerning a road such as distance information, legal speed limit, the number of traffic signals, the number of lanes, one-way traffic and other restriction information which are read out from the map disk 30, and calculates the optimal route based on the fastest route priority or the shortest route priority which is specified from the input device 2. Besides such a route for an automobile, it is also possible to calculate an optimal route for a walking person and a running bicycle. In this case, a parameter such as the walking speed and bicycle's running speed is referenced from the map disc 30. Further, in case of finding the route for a walker and a bicycle, it is possible to find a route by which a car can not pass.

A navigation guidance creation module 12 generates all the information necessary for the navigation guidance of a route according to the route data calculated by the route calculating module 11. Substantially, the navigation guidance creation module 12, while referencing the map data stored in the map disk 30 and using the route data calculated in the route calculation module 11, generates picture data such as an enlarged picture of an intersection (a configuration of the intersection) a land mark, a traffic signal, an arrow showing the advancing direction and a road sign which are necessary for route guidance. Further, on the guidance window showing a wide area map, the navigation guidance creation module 12 generates data for forming an enlarged display window (hereinafter, referred to as a navigation window) for displaying an enlarged picture of the popped-up intersection. That is, the navigation guidance creation module 12 constructs data for successively displaying on the navigation window the intersections along the route, referring to the picture data such as the enlarged picture of each intersection previously generated and the land mark and the guidance information. The guidance information includes, for example, position information of the intersection (an approximate position), a name of the intersection, a distance between the intersections, a name of the road, the direction to advance at a fork-shaped point, text information such as characters showing the land mark shown on the map, composite voice information in case of making a guidance about them by voice and so on. The picture data such as the enlarged map at each intersection and the guidance information are firstly stored in the RAM 5 or the hard disc 3.

A self-reproduction file creation module 13 extracts, from the route navigation data generated in the navigation guidance creation module 12, data required for a current route including enlarged pictures of intersections, land marks, traffic signals, arrows indicating the advancing direction, traffic signs such as no entrance allowed, and guidance information excluding sound information. Moreover, data for the control panel display and the self-reproduction driver software which will be detailed data are added for creation a self-reproduction file which has been optimally compressed for all these data and the wide area map.

Furthermore, in this self-reproduction file generation module 13, the self-reproduction file thus created is added with an automatic thawing driver software. The term "thawing" means the decompressing processing of a compressed archive file into a previous plurality of files. Moreover, in this Specification, "compressing processing" includes processing to compress a file and processing to compress one or more than one files into a single archive file.

The self-reproduction file created in this self-reproduction file creation module 13 is transmitted together with the automatic thawing driver software to the disk drive unit 6 or to the data I/O port 9 so as to be recorded on the floppy disk 31 or the memory card 32 for transmission as an electronic mail via a communication line.

The aforementioned route calculating module 11, the navigation guidance creation module 12, the self-reproduction file creation module 13, and the map viewing module 14 include the software stored in a storage apparatus 10. The storage apparatus 10, for example, includes a hard disk drive, a semiconductor memory, a CD ROM and the like and can be shared by the hard disk 3, the ROM 4, the RAM 5 or the map disk 30.

The map information providing apparatus as has thus far been described with reference to FIG. 1 carries out operations starting with the automatic route searching up to generating a self-reproduction file according to a flow shown in the flowchart of FIG. 2.

Figure 2:
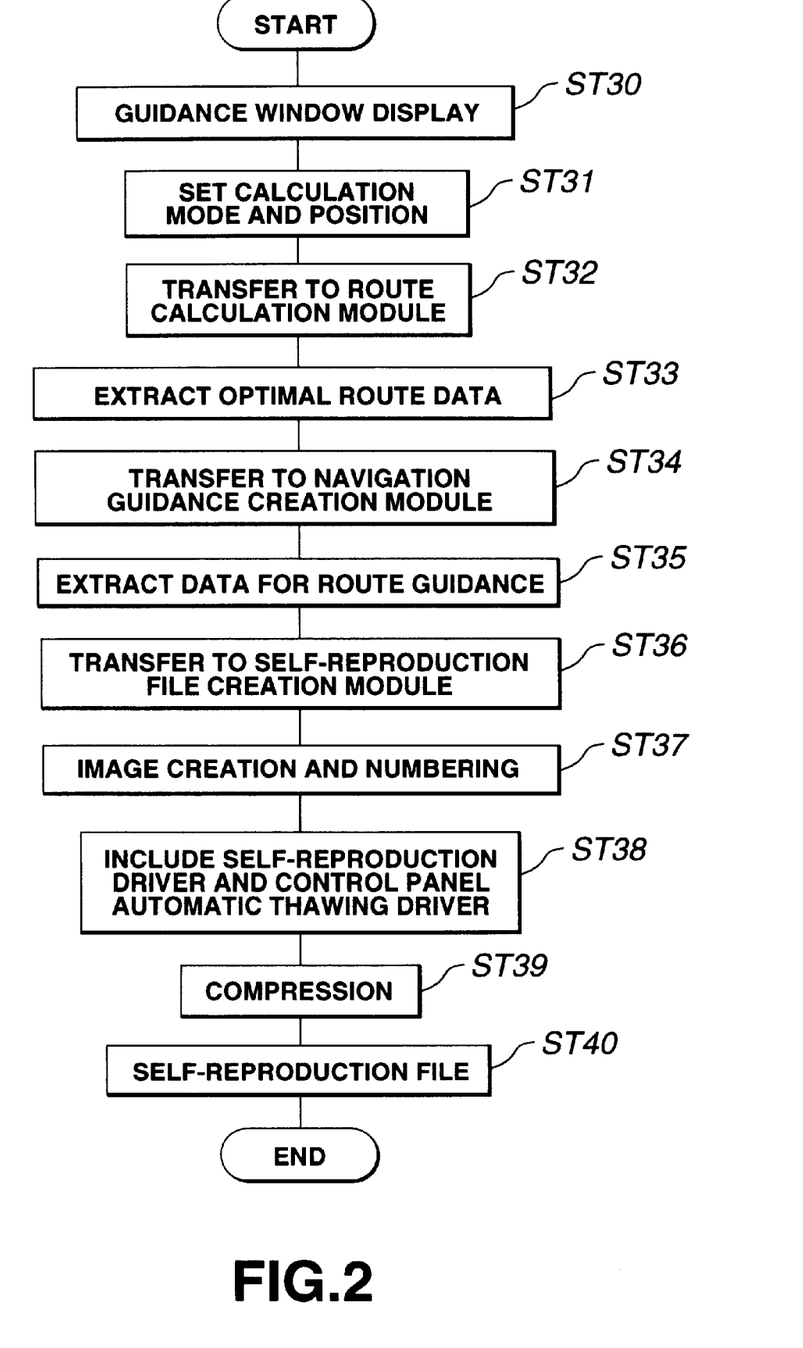
FIG. 2 is a flowchart showing a flow of processing in the map information providing apparatus according to the present invention.

In the flowchart of FIG. 2, at step ST30, the map viewing module 14 displays a wide area map on the display apparatus 7.

At the next step ST31, a user specifies through the input unit 2 the calculation mode, either the distance priority or time priority, and the starting point and the destination point, i.e., the end point required for the automatic route search.

At step ST32, the calculating condition is transmitted as the calculating condition parameter and the specified points such as the starting point, the destination and the passing place are transmitted as latitude/longitude data to the route calculating module 11.

At step ST33, an optimal route data (the route data) is extracted by using the calculating condition parameter and the latitude/longitude data in the route calculating module 11. The route data used here is substantially a list of intersections on the route.

At step ST34, the extracted optimal route data (that is, the data list of intersections on the route) is transmitted to the navigation guidance creation module 12.

At step ST35, the navigation guidance creation module 12 generates all the information necessary for route navigation according to the optimal route data calculated by the route calculating module 11. That is, the navigation guidance creation module 12 references the map data and so on recorded on the map disk 30 and selects intersections particularly necessary for navigation guidance, from the list of the intersections of the optimal route obtained from the route calculating module 11, and extracts the picture data such as enlarged pictures of the respective intersections selected, land mark, the traffic signal, the arrow indicating advancing direction and the road sign and the guidance information necessary for the guidance of the route. Moreover, at step ST35, the navigation guidance creation module 12 generates the information for displaying the navigation window. Through this guidance window and the navigation window, the user can recognize the route on the wide area map as well as see the enlarged picture of the intersection.

Figure 3:
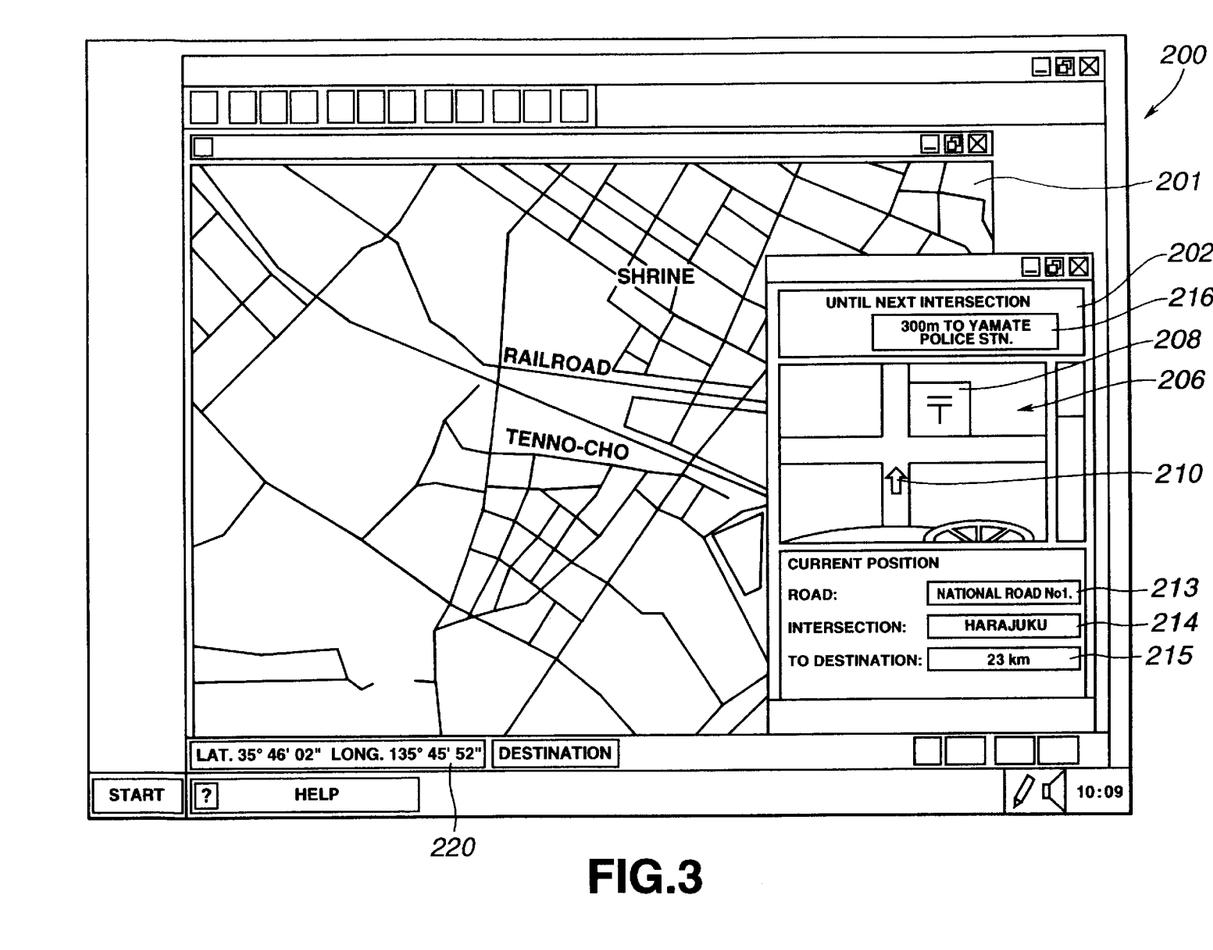
FIG. 3 is an example of the display screen showing a guidance window and a navigation window.

Here, FIG. 3 shows an example of a guidance window 201 and a navigation window 202 shown on the display screen 200 of the display apparatus 7. In this FIG. 3, for example, the guidance window 201 is popped-up on the display screen 200, show in a wide area map including the route, the destination, and the current position in a string of numerals indicating the latitude and the longitude. The navigation window 202 is further popped-up on the guidance window 201, showing an enlarged map 206 of one of the intersections successively displayed along the route. Further, in the enlarged map 206 of the intersection in the navigation window 202, for example, the landmark 208 of "a post office" as well as the arrow mark 210 showing the advancement direction. Outside the enlarged map 206, distance information on the route up to the next intersection such as "300 m to Yamate Police Station" is indicated in a character string 216, the name of the road "National Route No. 1" in a character string 213, the name of an intersection "Harajuku" in a character string 214, and a distance up to the destination, for example "23 km" in a character string 215.

Back to FIG. 2, at step ST36, the data created by the navigation guidance generation module 12 is transmitted to the self-reproduction file creation module 13.

In step ST37, in the self-reproduction file creation module 13, according to the information generated in the navigation guidance creation module 12, the following are generated: a map image within a predetermined range around the starting point (for example, Q [m]×P [m]); a map image within a predetermined range (for example Q [m]×P [m]) around the destination; enlarged pictures of the intersections on the route from the starting point to the destination; distances between the starting point, intersections and the destination (for example R [m]), and a simplified animation image (a map image displayed as a slide show which will be detailed later) for every 200 [m] in this embodiment, for example. Simultaneously with this, in this self-reproduction file creation module 13, each of the map images including the starting point, intersections, and the destination, and the animation images are numbered. Note that the values Q [m] and P [m] may be identical or different. That is, the predetermined range may be a square or a rectangular. Details of this step ST37 will be given later.

In step ST38, the self-reproduction file creation module 13 generates a self-reproduction file using the maps and the enlarged images generated in step ST37 in combination with the self-reproduction driver software and the data for control panel display which will be described later.

In step ST39, in the self-reproduction file creation module 13, the self-reproduction file is subjected to optimal compression processing. In the following step ST40, an automatic thawing driver software is added to the self-reproduction file which has been compressed.

The self-reproduction file added with the automatic thawing driver software is then stored in the floppy disk 31 or in the memory card 32, or transmitted via a communication line.

Figure 4:
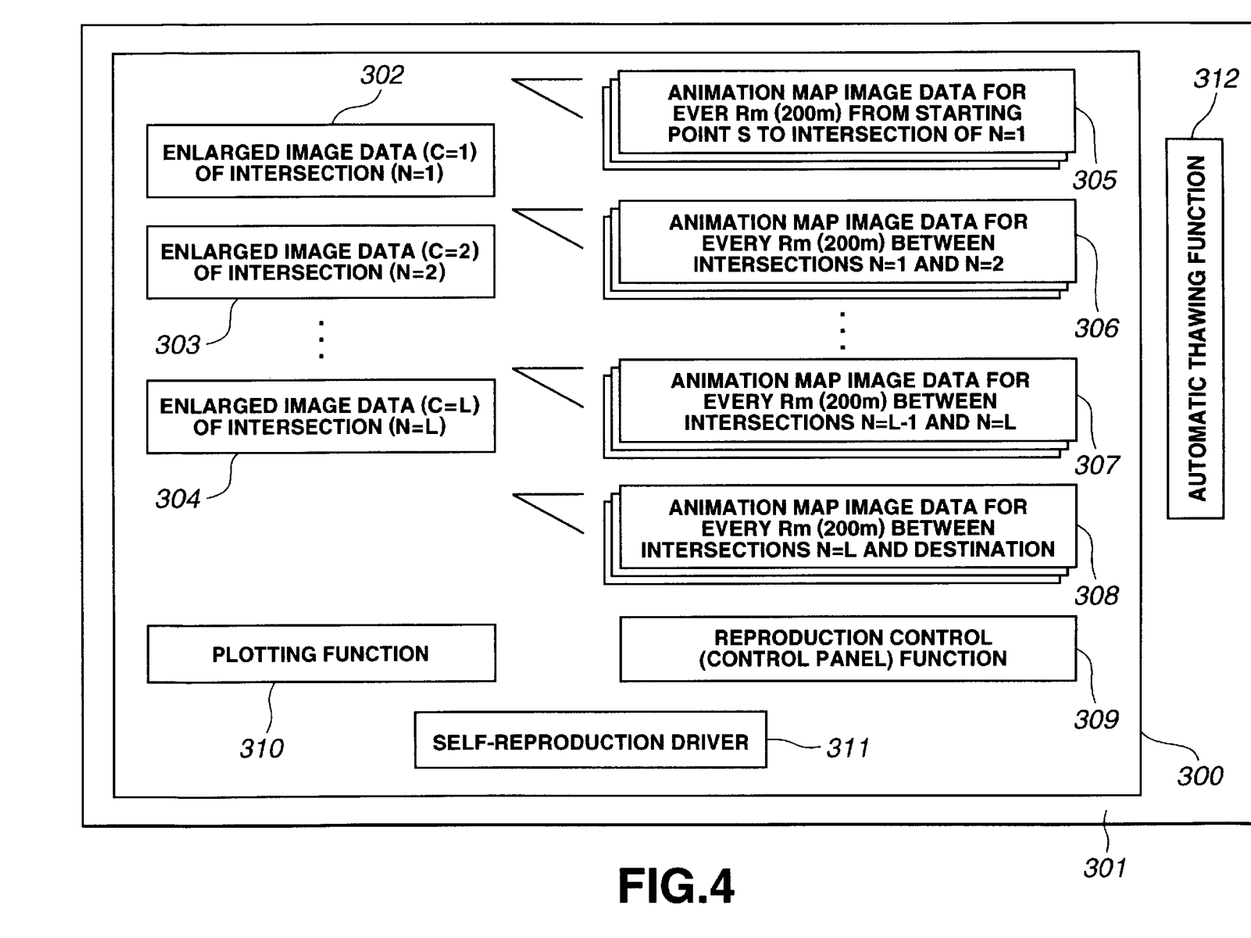
FIG. 4 is to be used for explanation of a configuration of a self-reproduction file.

Here, the self-reproduction file thus generated has a configuration shown in FIG. 4. In FIG. 4, the starting point and the destination are indicated by S and E, respectively. The variable N represents intersections on the route required for navigation guidance, the total of which intersections is, for example, L. The enlarged image data of intersections is represented by a variable C and a distance between two intersections is assumed to be R [m] (for example, 200 [m]).

In FIG. 4, the self-reproduction file 300 consists of enlarged image data 302 to 304; animation map image data groups 305 to 308; a plotting driver software 310 for plotting these image data on the screen by the personal computer; a reproduction control (control panel) driver software 309 for displaying the control panel image on the screen by a personal computer and carrying out an operation corresponding to an operation on the control panel; and the self-reproduction driver software 311. The file 301 which is stored on the floppy disk 31 or the memory card 32, or transmitted through a communication line is a total of the self-reproduction file 300 and the added automatic thawing driver software 312.

In the enlarged intersection image data 302 to 304, the variable N changes from 1 to L, i.e., there are L intersections. The animation map image data group consists of an animation map image data group 305 containing map images from the starting point to a first intersection (N=1), animation map image data groups 306 and 307 for the animation images between 1 and L (L−1 in total), and an animation map image data group 308 containing image data from a last intersection (N=L) to the destination E. It should be noted that the number n of the map image data existing in the respective animation map image data groups 305 to 308 differs, depending on the distance between the starting point S and the first intersection, the distances between two of the intersections, and the distance between the last intersection and the destination, respectively.

Figure 5:
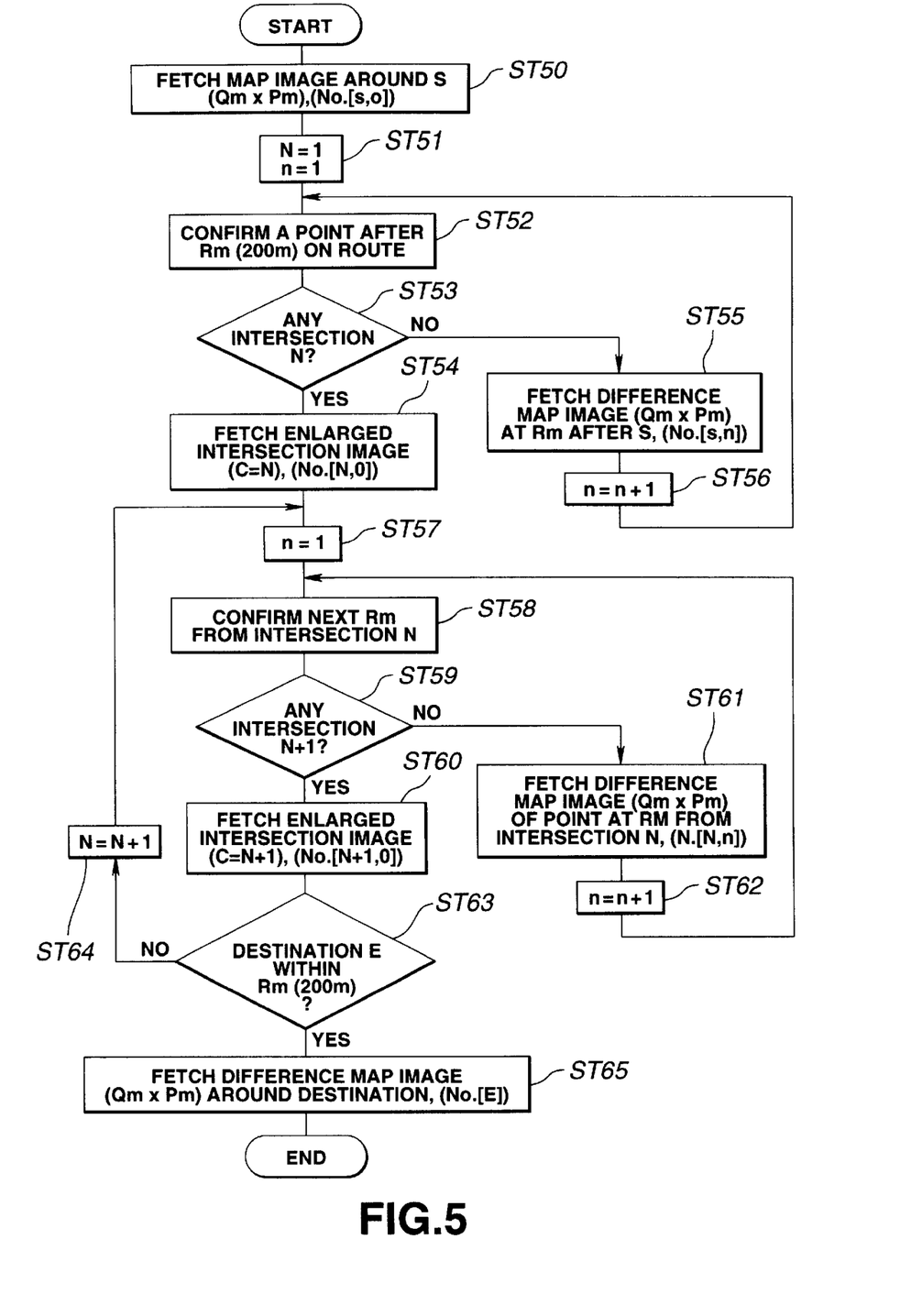
FIG. 5 is a flowchart showing a flow of map image creation, enlarged image creation, and numbering processing.

Description will now be directed to the detailed processing of step ST37 in the flowchart of FIG. 2, with reference to FIG. 5. That is, generation of the map image of the starting point, enlarged intersection images, map image of the destination, and animation map images between these points and intersections as well as a numbering processing for these images. Note that in the flowchart of FIG. 5, in the same way as in FIG. 4, the starting point and the destinations are indicated by S and E, respectively; intersections are indicated by a variable N; enlarged intersection image data, by a variable C; and animation map images, by a variable n.

In the flowchart of FIG. 5, in step ST50, a map image of a range of, for example Q [m]×P [m], around the starting point S is fetched and the map image around the starting point S is numbered (a number is assigned for this map image). In this embodiment, No. [S,0] is assigned for the map image around the starting point. Note that the map images hereinafter are fetched, for example, from map information which has been read out from the map disk 30 and stored in the RAM 5 or the hard disk 3. The map image around the starting point S can be made into an enlarged image.

In step ST51, the variable N representing an intersection and the variable n representing an animation map image are initialized to 1.

In step ST52, a point at R [m] (for example, 200 [m]) on the searched route from the starting point S is confirmed.

In step ST53, a judgment is made whether the route interval R [m] from the starting point S contains a first intersection (N=1). If the route interval R [m] from the starting point S does not contain a first intersection (N=1), control is passed to step ST55.

In step 55, a map image of an area Q [m]×P [m] around the starting point S is fetched and numbering is executed to this map image. In this embodiment, No. [S,n] is assigned for this map image. This map image is for the animation map for the variable n=1 for the point at R [m] from the starting point and accordingly, No. [S,1] is assigned. In order to reduce the amount of data this animation map image is used, for example, as a reference image, representing a change from the map image around the starting point S. That is a difference map image is obtained.

Following this step ST55, in step ST56, the variable n is incremented by 1 so as to be n=2, and control is returned to step ST52. Consequently, in step ST52, another point at R [m] from the first R point on the searched route from the starting point S is confirmed. That is, a point at 2R m from the starting point is confirmed. In step ST53, a judgment is made whether this route interval R contains an intersection of N=1. If the judgment is made to be "no" in the same way as has been described, in step ST55, a map image around the point at 2R m from the starting point is fetched and numbering is executed to this map image (No. [S,2]).

This procedure is repeated until an intersection of N=1 is found in step ST53. Thus, map images for the respective route intervals R [m] from the starting point S to the first intersection (N=1) is obtained as the animation map image data group 305 in FIG. 4.

If an intersection of N=1 is found in step ST53 and the judgment is made to be "yes", control is passed to step ST54. In step ST54, an enlarged image data of this intersection N=1 is fetched and a number is assigned to this enlarged intersection image data. In this case, the variable C of the enlarged intersection image data is the variable N, i.e., C=1, and, for example, No. [N,0] is assigned for this enlarged intersection image data.

Next, in step ST57, the variable n indicating an animation map image is initialized to 1.

In step ST58, a point at R [m] (for example, 200 [m]) from the intersection (of N=1) is confirmed.

In step ST59, a judgment is made whether the next route interval R [m] from this intersection contains an intersection of N+1 (=2) which is an object of the route guidance. If the judgment is made to be "no" for the intersection of N+1 (=2), control is passed from this step ST59 to step ST61.

In step 61, a map image of an area Q [m]×P [m] around the intersection (of N=1) is fetched and numbering is executed to this map image. In this case, No.[N,n] is assigned as a number for this map image. This map image is for the animation map for the variable n=1 for the point at R [m] from the intersection (of N=1) and accordingly, No.[N,1] is assigned. In the same way as has been described above, in order to reduce the amount of data this animation map image is used, for example, as a reference image, representing a change, for example, from the preceding map image. That is, a difference map image is obtained. Note that this difference map image can use a difference from the map image around the intersection N.

Following this step ST61, in step ST62, the variable n is incremented by 1 so as to be n=2, and control is returned to step ST58. Consequently, in step ST58, another point at R [m] from the first R point from the intersection (N=1) is confirmed. That is, a point at 2R m from the intersection (N=1) is confirmed. In step ST59, a judgment is made whether this route interval R contains an intersection of N+1 (=2). If the judgment is made to be "no" in the same way as has been described, in step ST61, a map image around the point at 2R m from the intersection (N=1) is fetched and numbering is executed to this map image (No. [N,2]).

This procedure is repeated until another intersection of N+1 (=2) is found in step ST59. Thus, map images for the respective route intervals R [m] from the intersection of N=1 to the next intersection of N+1 (=2) are obtained as the animation map image data group 306 in FIG. 4.

If an intersection of N+1 (=2) is found in step ST59 and the judgment is made to be "yes", control is passed to step ST63. In step ST63, an enlarged image data of this intersection of N+1 (=2) is fetched and a number is assigned to this enlarged intersection image data. In this case, the variable C of the enlarged intersection image data is the variable N+1, and, for example, No.[N+1,0] is assigned for this enlarged intersection image data.

Next, in step ST63, a judgment is made whether another interval R [m] (for example 200 [m]) from this intersection of N+1 (=2) contains the destination E. If the judgment is made to be "no" in this step ST63, control is passed to step ST64, where the variable N of the intersections is incremented by 1, and control is returned to step ST57. In this step ST57, in the same way as has been described above, the variable n indicating the animation map image is initialized to 1.

In step ST58 and after, the aforementioned processing is carried out for an intersection of the variable N (i.e., an intersection of N=2).

That is, in step ST58, a point at R [m] from the intersection of N=2 is confirmed. In step ST59, a judgment is made whether the next route interval R [m] from this intersection contains an intersection of N+1 (=3). If the judgment is made to be "no" for the intersection of N+1 (=3), control is passed from this step ST59 to step ST61, where a map image of a point at R [m] from the intersection (intersection of N=2) is fetched and numbering is executed to this map image (assigning No. [N,1]).

Next, in step ST62, the variable n is incremented by 1 and control is returned to step ST58. In step ST58, a point at 2R m from the intersection (of N=2) is confirmed. In step ST59, a judgment is made whether the interval 2R from this intersection contains an intersection of N+1 (=3). If the judgment is made to be "no" in this step ST59, control is passed to step ST61 where a map image around the point at 2R m from the intersection (N=2) is fetched and numbering is executed to this map image (assigning No. [N,2]).

The above processing is repeated until an intersection of N+1 (=3) is found in step ST59. By repeating this procedure, it is possible to obtain the animation map image data group 307 of FIG. 4 consisting of map images for the interval from the intersection of N=L−1 to the last intersection of N=L. Moreover, the animation map image data group 308 of FIG. 4 is obtained for the route interval from the last intersection of N=L up to a point at R [m] this side of the destination E.

Lastly, when the destination E is found in step ST63, control is passed to step ST65. In this step ST65, an image of an area of Q [m]×P [m] around the destination is fetched, and numbering is executed to this map image around the destination E. In this embodiment, No. [E] is assigned to the map image around the destination E. This map image of the destination can be made as a difference image with respect to the preceding map image, and can also be made as an enlarged map image around the destination E.

Description will now be directed to reproducing in another personal computer the self-reproduction file having the aforementioned automatic thawing driver software stored in the floppy disk 31 or in the memory card 32. Alternatively, the self-reproduction file having the aforementioned automatic thawing driver software is fed to another personal computer through a communication line. It is assumed the personal computer is not provided with an application software for map display and route search. That is, prior to receiving the self-reproduction file, the configuration of FIG. 1 lacks in the storage apparatus 10. Such a personal computer will be referred to as a reproduction personal computer in comparison to a personal computer provided with the aforementioned application software.

Figure 6:
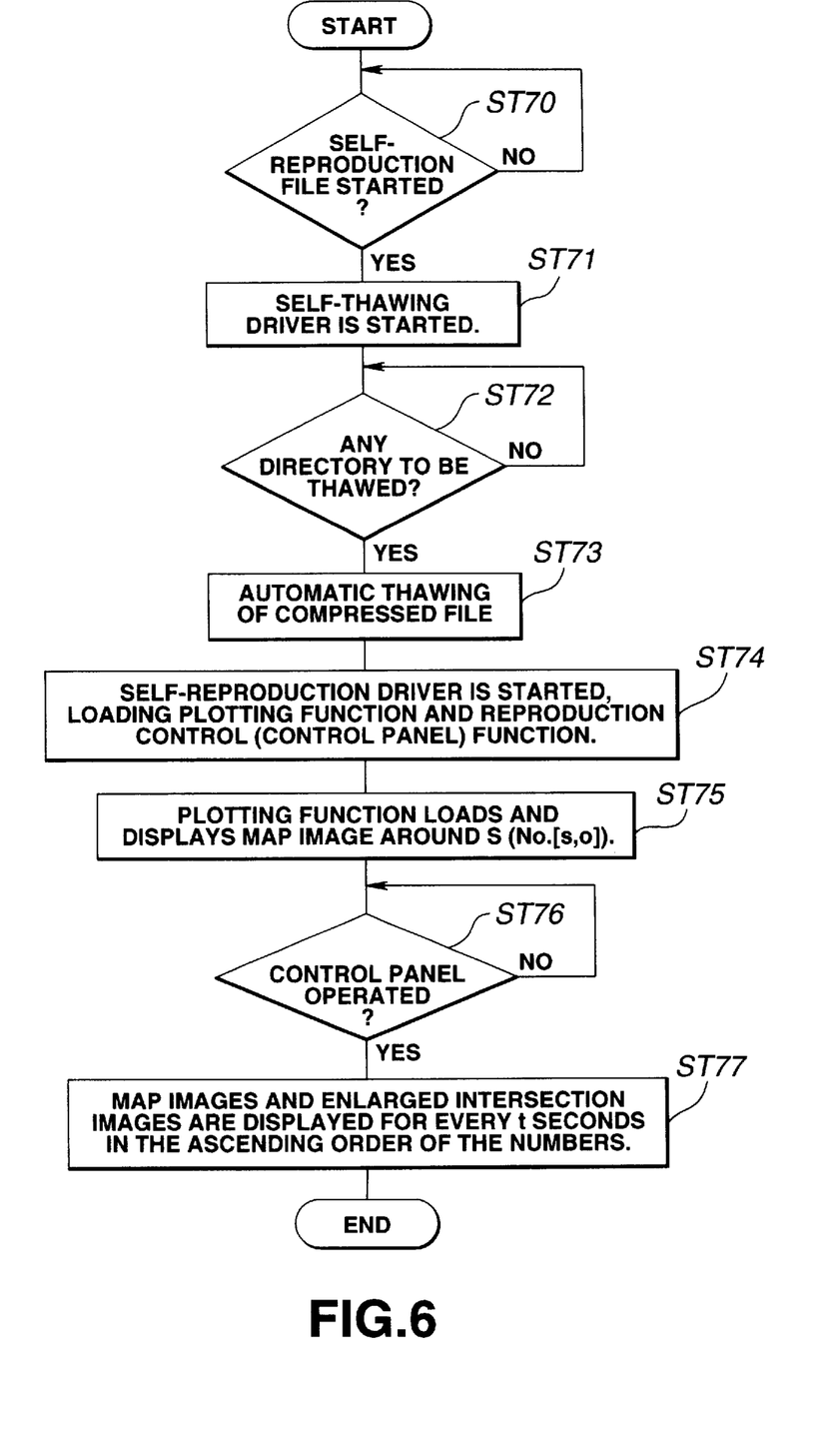
FIG. 6 is a flowchart showing a flow of processing when a self-reproduction file (self-reproduction application) is started.

The reproduction personal computer operates as shown in the flowchart of FIG. 6 upon reception of the self-reproduction file as shown in FIG. 4. It should be noted that the processing of the flowchart of FIG. 6 is mainly executed by a controller of the reproduction personal computer.

In FIG. 6, in step ST70, a judgment is made whether a user has specified to start the self-reproduction file shown in FIG. 4. If the self-reproduction file is started, in step ST71, the automatic thawing driver added to this self-reproduction file is started.

Next, in step ST72, a judgment is made whether a directory to be thawed has been selected. If the directory of the compressed self-reproduction file to be thawed is selected, in step ST73, processing is executed to thaw the compression.

In step ST74, the automatic reproduction driver of the self-reproduction file is started so as to load the plotting driver and the reproduction control (control panel) driver.

In step ST75, the plotting driver loads a map image of the area around the starting point (map image of No.[S,0]) and displays the map image of the area around the starting point.

In the following step ST76, a judgment is made whether any control input has been entered through the control panel. If a control input has been entered, processing of step ST77 is executed.

In step ST77, according to the input through the control panel, map images and enlarged intersection images from the self-reproduction file appear successively in the order of the assigned numbers (along the route) at every t seconds, for example.

Here, the operations of step ST74 to step ST77 of the flowchart of FIG. 6 will be detailed with reference to the flowchart of FIG. 7 and display examples of FIG. 8 to FIG. 10.

Figure 7:
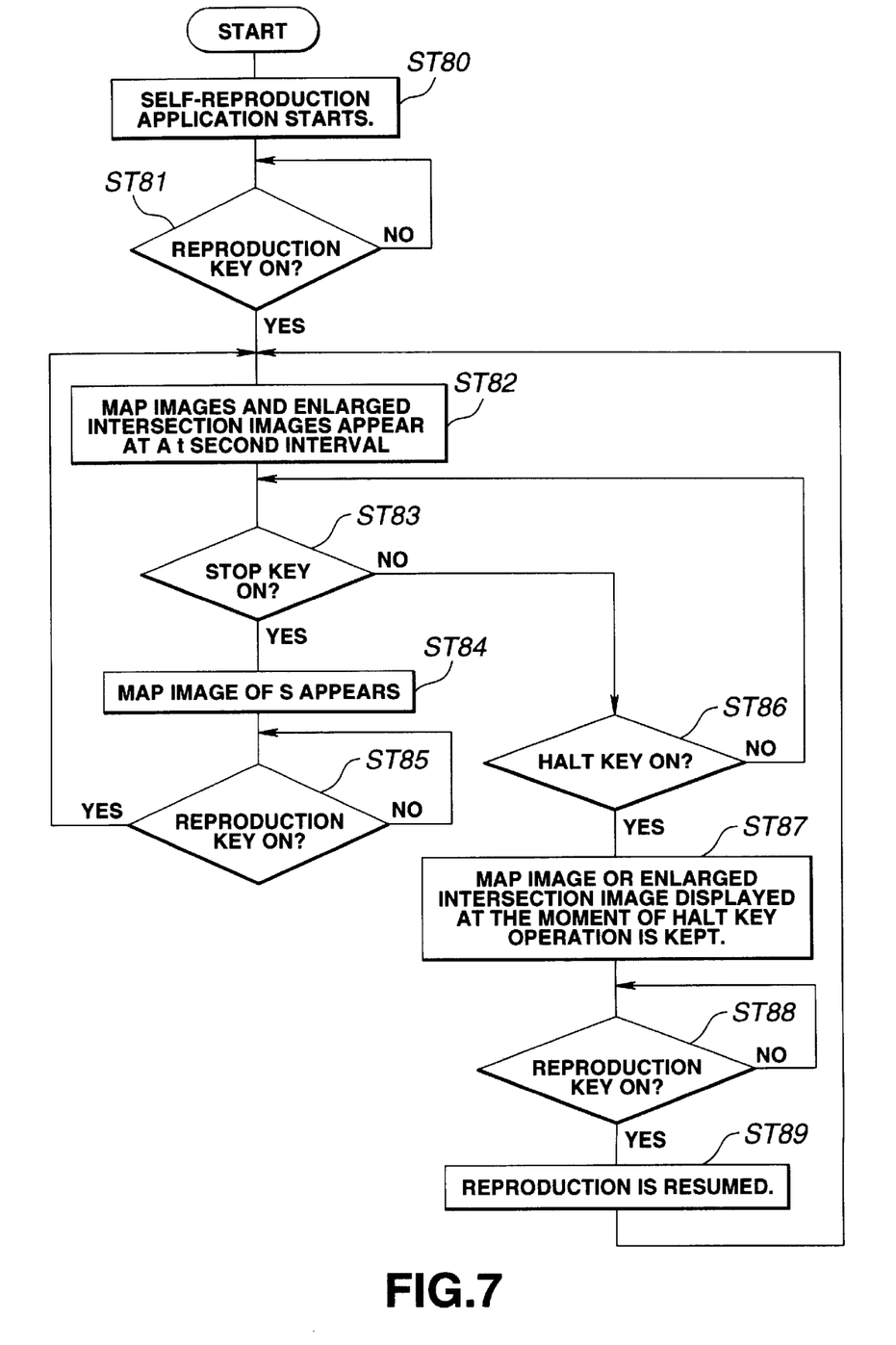
FIG. 7 is a flowchart showing a flow of reproduction control by a control panel after the self-reproduction file is started.
Figure 8:
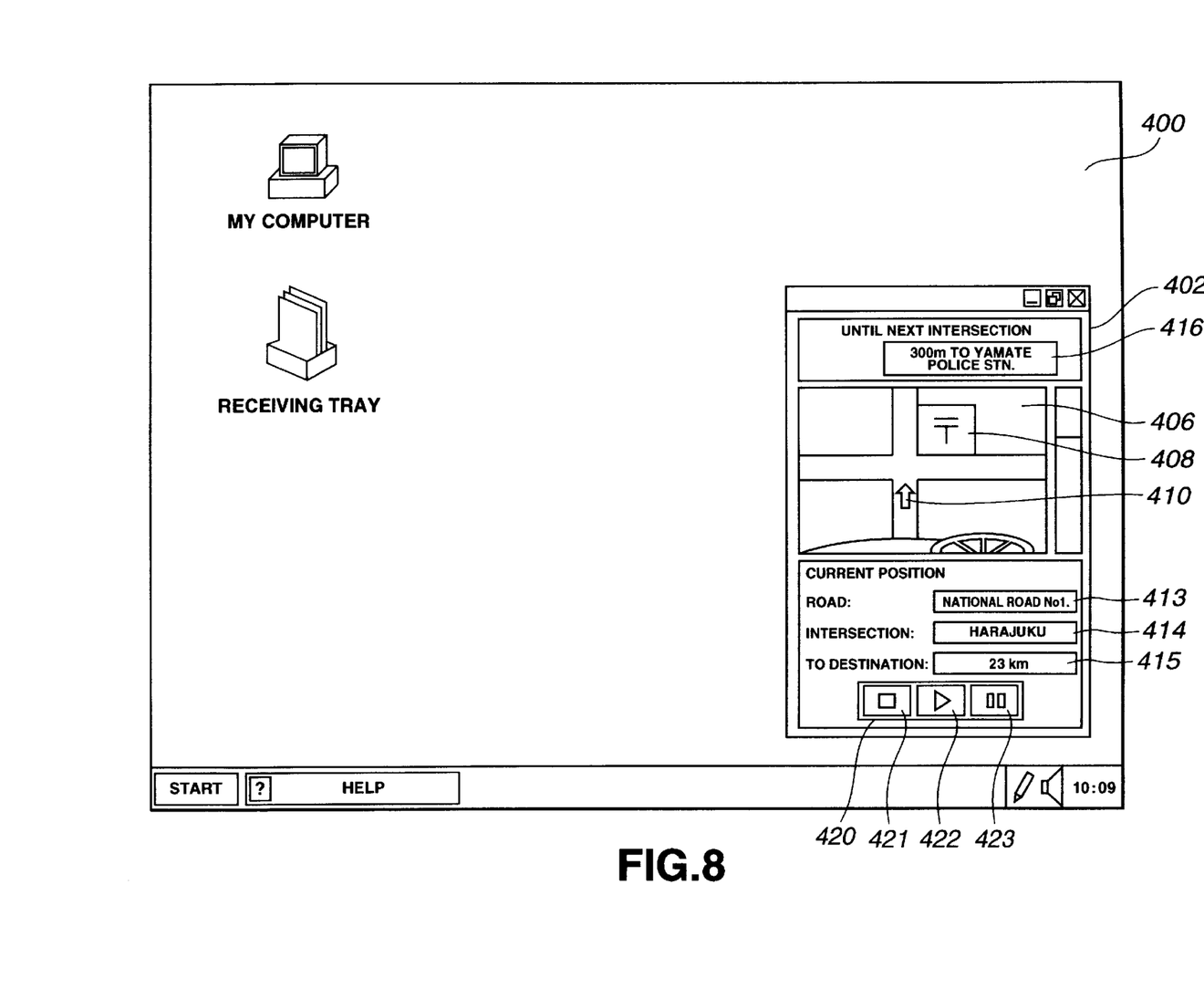
FIG. 8 shows an example of the initial display screen after the self-reproduction file is started.

In FIG. 7, when the self-reproduction driver (self-reproduction application) is started in step ST80 as in ST74 of FIG. 6, the display of the reproduction personal computer shows the information as is shown in FIG. 8, for example.

FIG. 8 shows an example of a map image of the area around the starting point. In this display of FIG. 8, the map image around the starting point is an enlarged image, such as the one shown in the navigation window of FIG. 3. In the display example of FIG. 8, a window 402 similar to the navigation window is popped-up on a display screen 400 of the reproduction personal computer. In this window 402 is displayed an enlarged image 406 around the starting point. The enlarged image 406 contains, for example a land mark 408 of a "post office" as well as an arrow mark 410 indicating the direction of advancement. Outside this enlarged image 406, various information items given: such as the information for a route interval up to the next intersection, a character string 416 indicating distance information from the starting point to the next intersection is shown, such as "300 m to Yamate Police Station"; the road name is indicated, for example, by a character string 413, such as "National Road No. 1"; the intersection name is indicated by a character string 414, such as "Harajuku"; and the distance up to the destination is indicated by a character string 415, such as "23 km"

This window 402 also contains a display of a control panel 420. This control panel 420 includes: a reproduction key 422 which is used, to in this reproduction personal computer, to reproduce the map images used for the route guidance, as simplified animation, i.e., to specify successive reproduction of the map images which are still images such as in a slide show; a stop key 421 used to specify to stop the slide show and return to the initial screen; and a halt key 423 to specify to temporarily stop the slide show. These keys on the control panel 420 can be selected, for example, by a mouse cursor to carry out the operations corresponding to the respective keys.

That is, back to FIG. 7, the self-reproduction application is started in step ST80 the display as shown in FIG. 8 has appeared on the screen. Then, in step ST81, a judgment is made whether the reproduction key 421 has been specified. If a judgment is made in this step ST81 that the reproduction key 421 has been specified, in step ST82, map images and enlarged intersection images successively appear at a time interval of t along the route (in the order of the numbering). That is, a slide show is carried out to successively display the still images of the map images and the enlarged intersection images along the route for navigation. Note that instead of this slide show, it is possible to display an animation.

In the following step ST83, a judgment is made whether the stop key 421 has been specified. If a judgment is made that the stop key 421 is turned on, in step ST84, the display is returned to the map image of the starting point and the slide show is terminated. In the following step ST85, a judgment is made whether the reproduction key 422 is again turned on. If the reproduction key 422 is turned on again, in step ST82, the aforementioned slide show for route navigation is carried out, starting at the starting point.

On the other hand, if a judgment is made in step ST83 that the stop key has not been turned on, the slide show for the route navigation continues. In this case, a judgment is made in step ST86 whether the halt key 423 has been turned on. If a judgment is made in this step ST86 that the halt key 423 is turned on, control is passed to step ST87 where the map image or the enlarged intersection image at the moment when the halt key 423 is turned on is kept on the screen, temporarily halting the slide show display.

Next, in step ST88, a judgment is made whether the reproduction key 422 is turned on so as to release the halt state. If a judgment is made that the reproduction key 422 is turned on, control is passed to step ST89.

In step ST89, the halt state is released at the moment when the reproduction key 422 is turned on so as to resume the slide show display showing the slide which has been halted and after. After this, control is returned to step ST82 and the aforementioned processing is executed.

Figure 9:
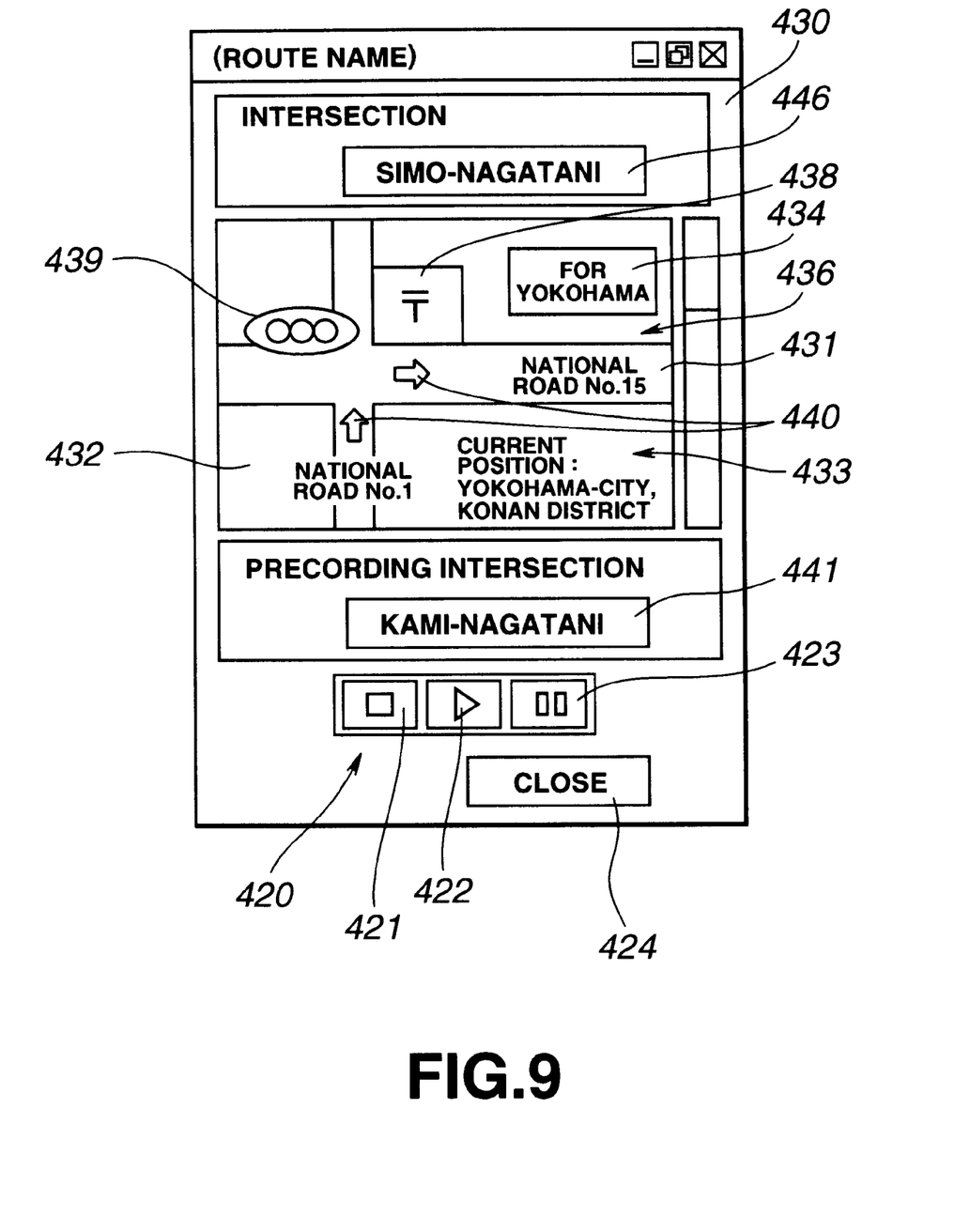
FIG. 9 shows an example of the window display in a halt state of a slide show for a route navigation.

Here, it is assumed that the window 430 shows an image as shown in FIG. 9 when the halt is specified. That is, in the example of FIG. 9, an enlarged intersection image is displayed when the halt is operated. In the enlarged intersection image 436 of the window 430 contains a "post office" as the land mark 438, the arrow mark 440 indicating the advance direction, the land mark 439 of a "traffic signal", character strings 423 and 431 indicating the road names, for example, "National Road No. 1" and "National Road No. 15", respectively, and a character string 433 indicating the position of the intersection "Yokohama-city, Konan-district", as well as a character string 434 indicating a temporary destination "To Yokohama". Moreover, outside the enlarged image 436, there is character string 446 indicating the name of the intersection such as "Simo-Nagatani" and a character string 441 indicating the name of a preceding intersection such as "Kami-Nagatani". Furthermore, the window 430 contains the reproduction key 422, the stop key 421, and the halt key 423 of the control panel 420 plotted. The window 430 also displays a close key 424 used to close the self-reproduction file application itself.

If the reproduction key 422 is turned on when the aforementioned halt state continues, a slide show such as shown in FIG. 10 is executed on the reproduction personal computer. FIG. 10A shows an enlarged intersection image at the moment when the halt is specified; FIG. 10B schematically shows the range which will be shown in the slide show after the halt state is released; FIG. 10C represents a map image displayed in the area WC on the map of FIG. 10B; FIG. 10D represents a map image displayed in the area WD on the map of FIG. 10B; and FIG. 10E shows an enlarged image around the destination which appears at a point within 200 m this side of the final destination.

Figure 10A:
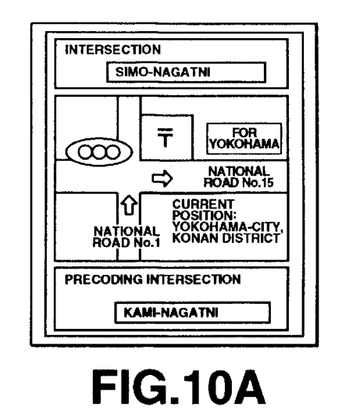
FIGS. 10A, 10B, 10C, 10D and 10E are to be used for explanation of a flow of the slide show for the route navigation.
Figure 10B:
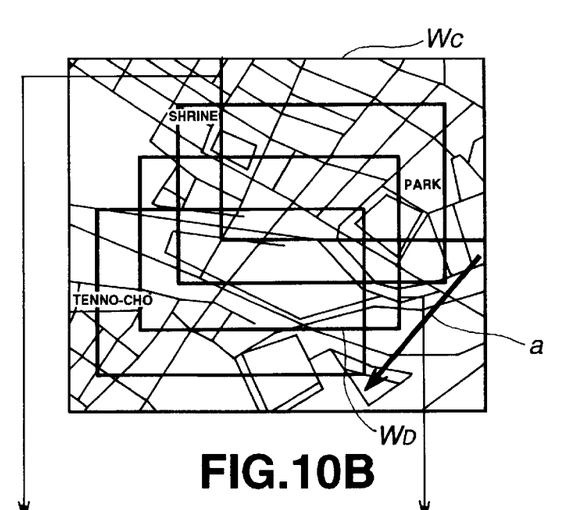
Figure 10C:
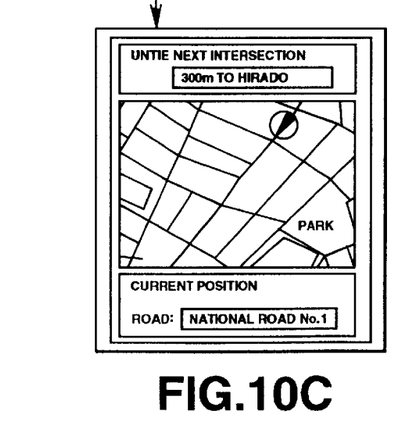
Figure 10D:
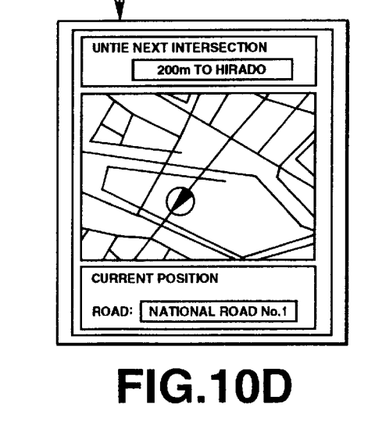
Figure 10E:
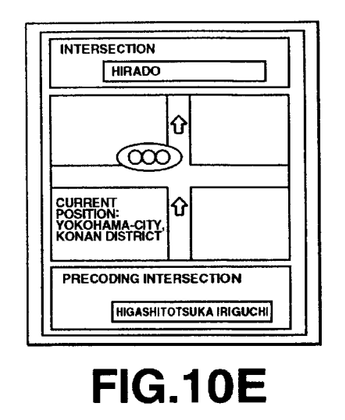

That is, in FIG. 10, if the reproduction is resumed after the halt display of FIG. 10A, map images successively appear as a slide show in the order of, for example, from FIG. 10C to FIG. 10D in the direction indicated by the arrow a in FIG. 10B, and when the point enters within 200 m from the final destination, the enlarged image around the destination as shown in FIG. 10E appears on the screen.

Figure 11:
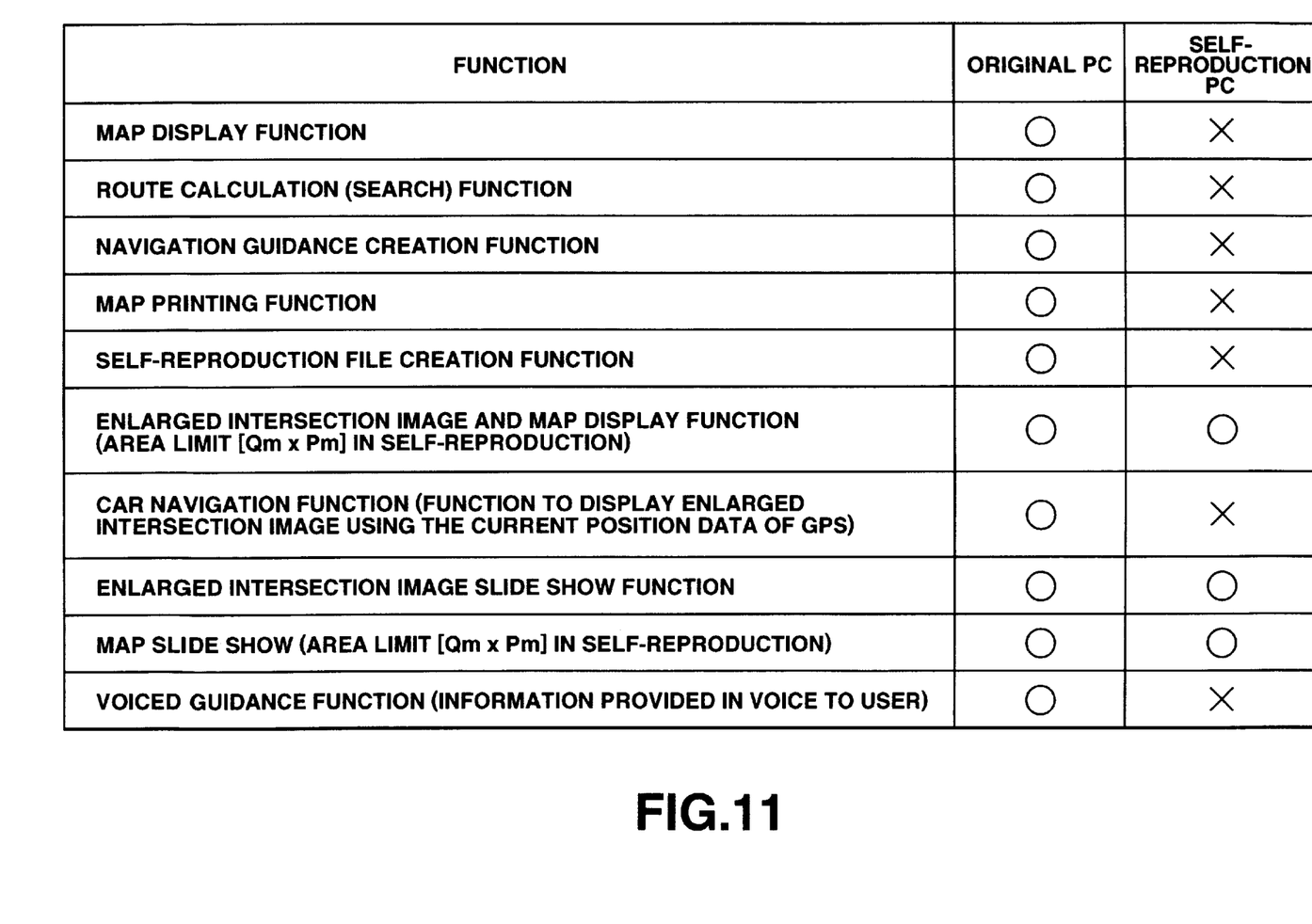
FIG. 11 shows a difference in functions available in a personal computer provided with a map display and route search application software and in a personal computer operated only by a self-reproduction file.

FIG. 11 shows differences between a personal computer which carries out the aforementioned route search and creates a self-reproduction file and a personal computer capable of only a slide show. That is, the personal computer which creates a self-reproduction file (referred to as an original computer in FIG. 11) is provided with: a digital map display function capable of displaying all the map information items; a function capable of executing route calculations (search); a function for creating guidance information for a route navigation; a map printing function for arranging and printing, for example, enlarged images for easy viewing; a function for creating a self-reproduction file; a function for displaying an enlarged intersection image and a map image; a so-called car navigation function (function for displaying enlarged intersection images using the current position data of the Global Positioning System (GPS)); a function for carrying out a slide show of digital maps; and a sound guidance function. On the other hand, the reproduction personal computer which has fetched the self-reproduction file (referred to as a self-reproduction personal computer in FIG. 11) has only the function for displaying an enlarged intersection image and a map image; the slide show function of the enlarged intersection image; and the slide show function of digital maps.

Separately from the self-reproduction function according to the present invention, there is a projector function of "Director" (trade name) produced by Macromedia Co., Ltd. as a self-reproduction application which is currently available. The "Director" is a so-called authoring software which is generally used for an interactive movie creation of a CD-ROM. This software has a function for conversion into a file format which can be reproduced where the "Director" itself does not exist, so that an interactive movie created is made into a CD-ROM package. This file format of the "Director" is defined by the name of "projector".

On the other hand, the map information providing apparatus and method according to the present invention realizes a self-reproduction application, enabling it to be used in a personal computer which is not provided with an application software for map display and route search. Moreover, it is possible to provide map information, for example, route guidance in a form of an animation using maps which can easily be viewed, which enlarges the range of use of the navigation system. This cannot be obtained by the conventional car navigation system. This function is enabled only in an application for a personal computer. Simultaneously with this, the possibility to deliver the self-reproduction file means that it is possible to spread the application software which creates the self-reproduction file, which enables to expect sales effects of this application software.

It should be noted that the present invention enables one to cut and paste a still image and the like at the level of the operating system (OS) and is applicable to a multimedia extension software capable of editing an animation.

As has been described above, according to the present invention, a predetermined sequence of image information is created for indicating a route between at least two points of a starting point and a destination, and reproduction control information is created for reproducing this predetermined sequence of image information, so as to file the image information and the reproduction control information, so that route information obtained by search can be provided to even a personal computer which is not provided with an application software for a route search between two points of a starting point and a destination.

What is claimed is:
1. A map information providing apparatus comprising:
  image information fetch means for fetching, from map information, image information of passing points along a route connecting at least two points;

reproduction image creating means for creating reproduction image information along the route from said image information; and filing means for filing only said reproduction image information and reproduction control information for reproducing said reproduction image information, filing occurring in the absence of filing route search application software.

2. A map information providing apparatus as claimed in claim 1, wherein said image information fetch means fetches an enlarged intersection image information as an image information of at least said passing points.

3. A map information providing apparatus as claimed in claim 2, wherein said image information fetch means also fetches a guidance information required for guidance of said intersections.

4. A map information providing apparatus as claimed in claim 1, wherein said image information fetch means fetches a map image information for every predetermined route interval as an image information of at least said passing points.

5. A map information providing apparatus as claimed in claim 4, wherein said reproduction image creating means creates as a reproduction image information a difference image information consisting of differences between an image information of a predetermined position on a map data and a map image information of said every predetermined route interval.

6. A map information providing apparatus as claimed in claim 1, wherein said image information fetch means fetches at least as an image information of said passing points an enlarged intersection information and a map image information for every predetermined route interval between said intersections.

7. A map information providing apparatus as claimed in claim 1, wherein said reproduction control information includes control data to at least start and stop reproduction of said reproduction image information.

8. A map information providing method comprising:

an image information fetch step for fetching, from map information, image information at passing points on a route connecting at least two points;

a reproduction image creation step for creating reproduction image information along the route from said image information; and a filing step for filing only said reproduction image information and reproduction control information for reproducing said reproduction image information, said filing occurring in the absence of filing route search application software.

9. A map information providing method as claimed in claim 8, wherein said image information fetch step fetches as the image information of at least said passing points an enlarged intersection image information.

10. A map information providing method as claimed in claim 9, wherein said image information fetch step also fetches a guidance information required for guidance of said intersections.

11. a map information providing method as claimed in claim 8, wherein said image information fetch step fetches at least as the image information of the passing points a map image information for every predetermined route interval.

12. A map information providing method as claimed in claim 11, wherein said reproduction image creation step creates as a reproduction image information a difference image information consisting of differences between an image information of a predetermined position on the map data and a map image information of said every predetermined route interval.

13. A map information providing method as claimed in claim 8, wherein said image information fetch step fetches as the image information of at least said passing points, an enlarged intersection image information and a map image information for every predetermined interval between said intersections.

14. A recording medium which contains control instructions to control:

processing for fetching, from map information, image information of passing points on a route connecting at least two points;

processing for creating reproduction image information along the route from the image information;

processing for filing only the reproduction image information and reproduction control information for reproducing said reproduction image, said filing occurring in the absence of filing route search application software.

15. A recording medium containing:

reproduction image information created along a route connecting at least two points created according to an image information of passing points on the route, the reproduction image information fetched from map information; and reproduction control data for reproducing said reproduction image information in absence of route search application software.

* * * * *